(12) United States Patent
Takayanagi (10) Patent No.: US 6,428,375 B2
(45) Date of Patent: Aug. 6, 2002

(54) FUEL COOLING APPARATUS OF OUTBOARD MOTOR

(75) Inventor: Masashi Takayanagi, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/809,195

(22) Filed: Mar. 16, 2001

(30) Foreign Application Priority Data

Mar. 16, 2000 (JP) ........................................ 2000-074136

(51) Int. Cl.⁷ .............................................. B63H 21/10
(52) U.S. Cl. ........................................................ 440/88
(58) Field of Search ................... 440/88, 900; 123/516, 123/457

(56) References Cited

U.S. PATENT DOCUMENTS 6,006,705 A * 12/1999 Kato et al. ............. 123/73 AD
6,112,726 A * 9/2000 Saito et al. ................ 123/509

FOREIGN PATENT DOCUMENTS

JP  6-280709  10/1994
JP  11-117822  4/1999

\* cited by examiner

*Primary Examiner*—Ed Swinehart
(74) *Attorney, Agent, or Firm*—Oblon, Spivak, McClelland, Maier & Neustadt, P.C.

(57) ABSTRACT

A fuel cooling apparatus of an outboard motor with a water-cooled engine having a vapor separator, a fuel injector positioned to supply a fuel from the vapor separator into the engine, a high pressure fuel pump positioned in the vapor separator to feed the fuel under pressure to the fuel injector, and a pressure regulator positioned in the vapor separator to reduce a pressure of a return fuel, the fuel cooling apparatus including a fuel cooler having fuel and cooling water passages arranged side by side in parallel, the fuel passage interposed in a high pressure return fuel hose branched off from a high pressure fuel hose connecting the high pressure fuel pump and fuel injector and connected to upstream of the pressure regulator, the cooling water passage being positioned to circulate cooling water for cooling the engine to cool the fuel in the fuel passage.

11 Claims, 10 Drawing Sheets

FUEL COOLING APPARATUS OF OUTBOARD MOTOR

BACKGROUND OF THE INVENTION

The present invention relates to a fuel cooling apparatus of an outboard motor.

An outboard motor is generally provided with a water-cooled type engine which is cooled by utilizing seawater or like and with equipments for a fuel system arranged at the periphery thereof.

Figure 10:
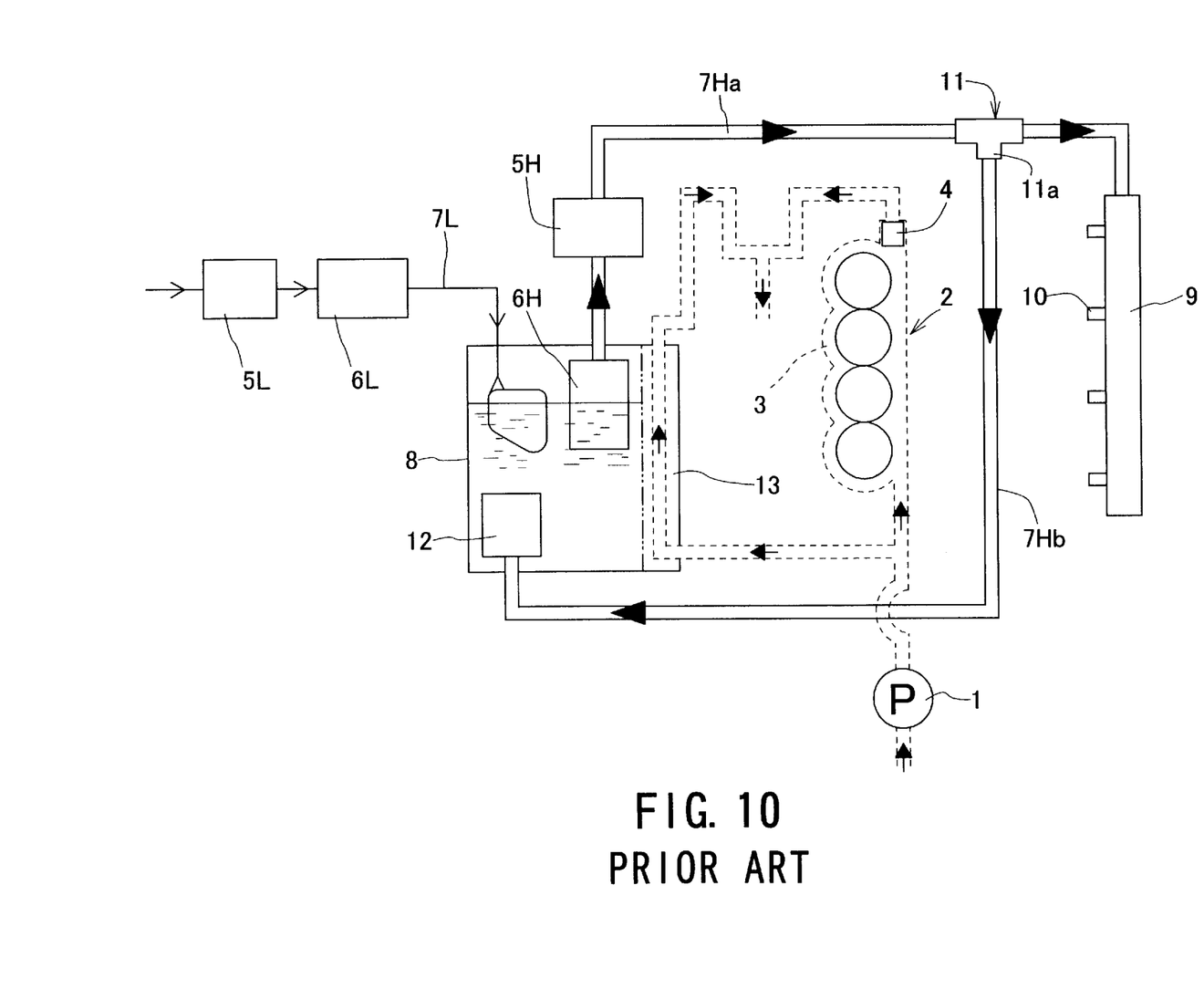
FIG. 10 is a block diagram showing a cooling system and a fuel system having a conventional arrangement.

FIG. 10 is a block diagram showing a cooling system and a fuel system in a general outboard motor. As shown in FIG. 10, a seawater is introduced to an engine 2 through an operation of a water pump 1.

A portion of the introduced cooling water is branched into two flows before reaching the engine 2, one being introduced to the engine 2 and the other being introduced to the fuel system. The cooling water introduced to the engine 2 is discharged after being introduced to a water jacket 3, for example, formed in a cylinder block 2a or like so as to cool the engine 2. In this case, a thermostat 4 for preventing the engine 2 from being excessively cooled is provided at an outlet portion of the water jacket 3.

On the other hand, a fuel in a fuel tank, not shown, is fed under pressure to a vapor separator 8 by means of a low pressure fuel hose 7L through an operation of a low pressure fuel pump 6L after being filtered by a low pressure fuel filter 5L. The fuel in the vapor separator 8 is fed under pressure to a high pressure fuel filter 5H through the operation of a high pressure fuel pump 6H disposed in the vapor separator 8, fed to a delivery pipe 9 by means of a high pressure fuel hose 7Ha after being filtered and then injected to a suction port, not shown, by a fuel injector 10 provided for the delivery pipe 9.

Further, a branch pipe 11 is provided at a middle portion of the high pressure fuel hose 7Ha extending to the delivery pipe 9 from the high pressure fuel filter 5H. Further, a high pressure return fuel hose 7Hb extending to the vapor separator 8 is connected to a branch portion 11a of the branch pipe 11 and is connected to a pressure regulator 12 disposed in the vapor separator 8.

In this case, since the engine 2 of the outboard motor can not be excessively cooled because an oil temperature should be kept at a predetermined temperature, and accordingly, a temperature of an atmosphere in an engine cover is increased, so that the fuel in the fuel system generates a vapor, and a vapor generation is reduced by forming a water jacket 13 in the vapor separator 8 so as to introduce a portion of the engine cooling water in the water jacket 13 to thereby cool the fuel.

However, when the water jacket is formed in the vapor separator in order to cool the fuel, a structure of the vapor separator becomes completed, and an outer shape of the vapor separator becomes large, thus being inconvenient for the compact structure of an outboard motor.

SUMMARY OF THE INVENTION

The present invention has been made by taking the matters mentioned above into consideration, and an object of the present invention is to provide a fuel cooling apparatus of an outboard motor having a compact structure and achieving an effective operational functions.

This and other objects can be achieved according to the present invention by providing a fuel cooling apparatus of an outboard motor which is provided with a water-cooled engine having a crank shaft arranged substantially in a vertical direction and in which a fuel is supplied to the engine through a fuel injector after temporarily introducing the fuel to a vapor separator, wherein a high pressure fuel pump is arranged in the vapor separator so as to feed the fuel under pressure to the fuel injector, a pressure regulator is arranged in the vapor separator so as to reduce a pressure of a return fuel, a fuel cooler having a fuel passage and a cooling water passage arranged side by side in parallel to each other is arranged on an upstream side of the pressure regulator, and cooling water for cooling the engine is introduced to the cooling water passage so as to cool the fuel in the fuel passage.

In preferred embodiments in the above aspect of the present invention, the engine is provided, on a side surface thereof, with a suction manifold constituting a suction device and the fuel cooler is mounted to the suction manifold through at least one bracket. The fuel cooler is arranged in a space between a mounting portion of the suction manifold and a delivery pipe to which the fuel injector is mounted.

The cooling water for cooling the engine is branched upstream of the engine side and one of the branched cooling water portions is introduced to the fuel cooler. The fuel cooler is extrusion molded or draw molded from an aluminum material so as to integrally form the fuel passage and the cooling water passage.

As mentioned above, according to the fuel cooling apparatus of the outboard motor of the present invention, the outboard motor can be made compact. It is possible to reduce the number of the assembling steps due to the modulation, reduce the weight and make the shape of the fuel cooling apparatus compact. Furthermore, the cooling effects of the fuel can be enhanced.

The structure and the shape of the cooling apparatus can be made simple. The dead space in the engine can be effectively utilized.

The nature and further characteristic features of the present invention will be made more clear from the following descriptions with reference to the accompanying drawings.

DESCRIPTION OF THE PREFERRED EMBODIMENTS

A preferred embodiment of the present invention will be described hereunder with reference to the accompanying drawings.

Figure 1:
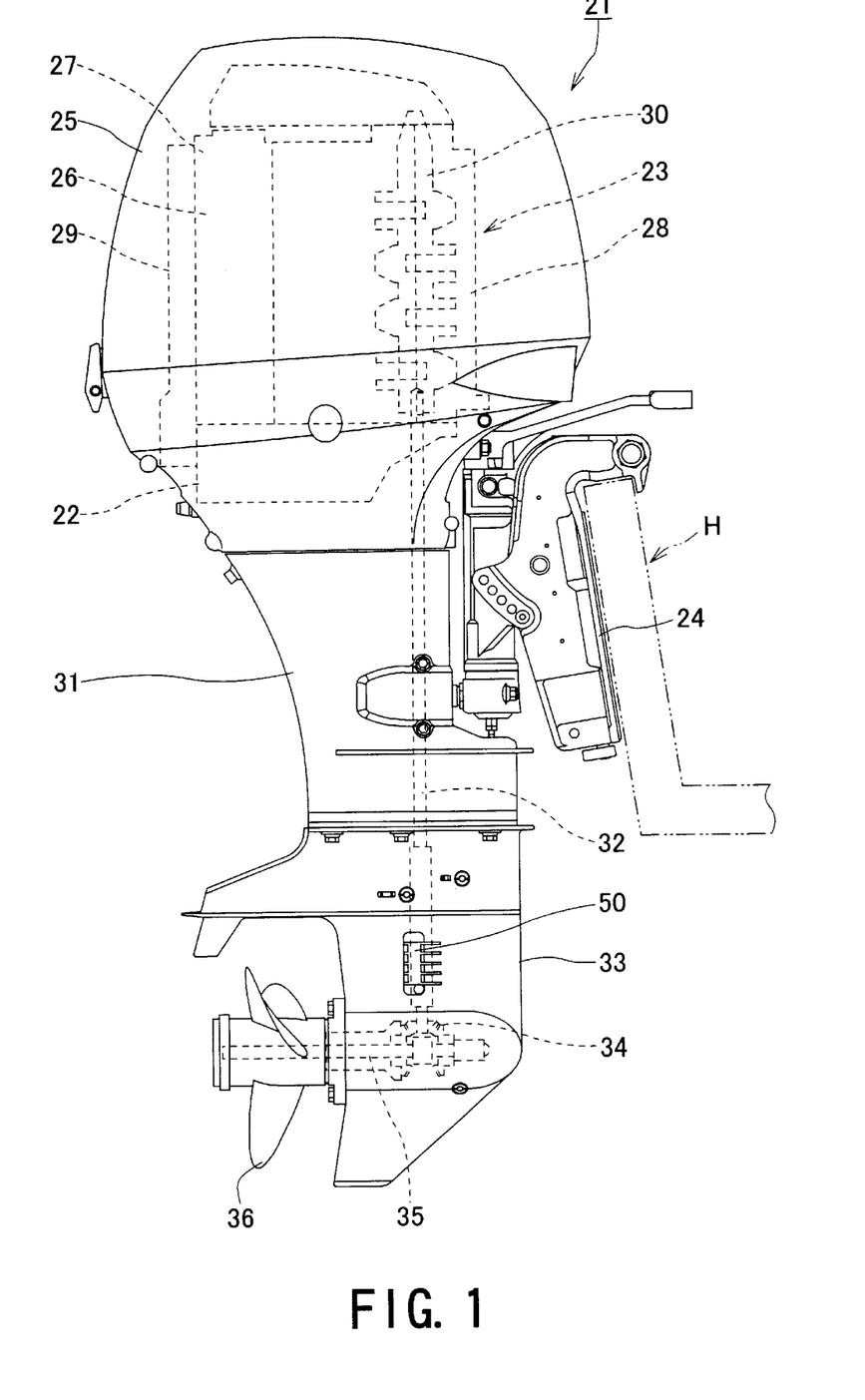
FIG. 1 is a right side elevational view of an outboard motor showing one embodiment of a fuel cooling apparatus of an outboard motor according to the present invention.
Figure 2:
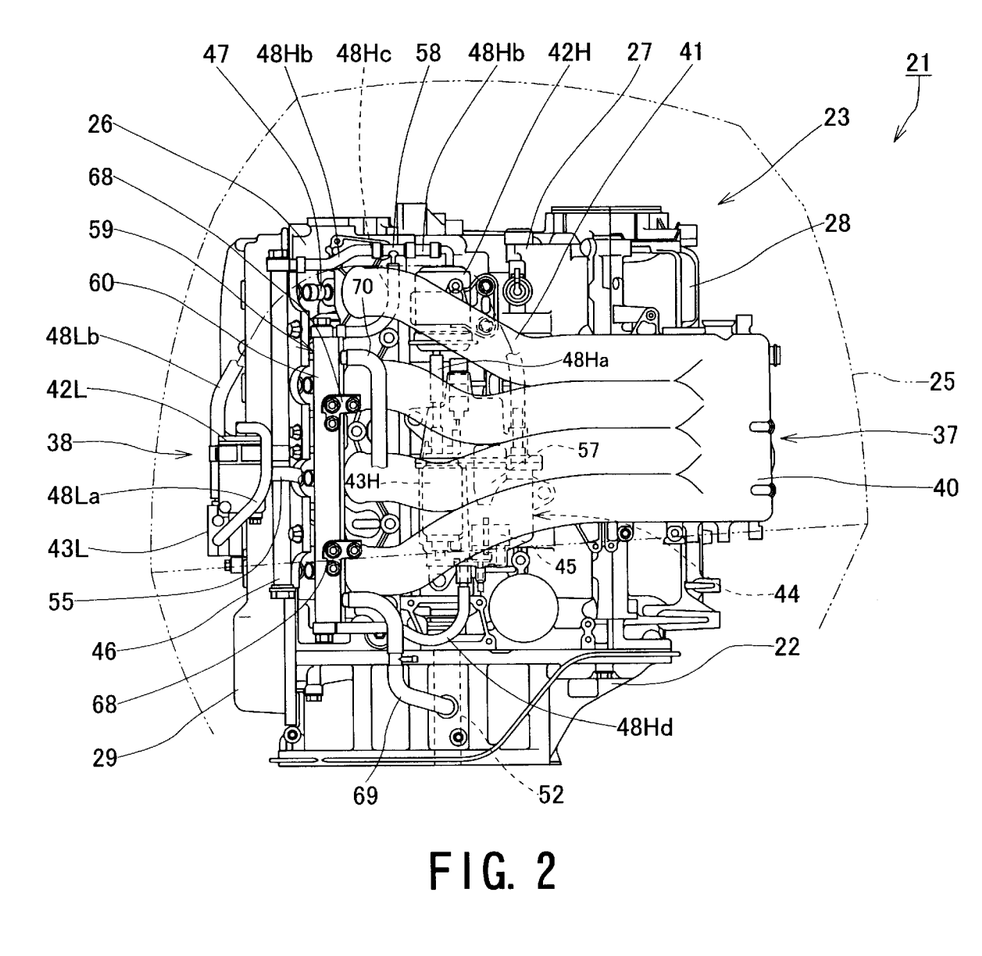
FIG. 2 is a right side elevational view showing a first example of an outboard motor in a state of removing an engine cover.

First, with reference to FIGS. 1 and 2, an outboard motor 21 is provided with an engine holder 22 and an engine 23 provided above the engine holder 22. A clamp bracket 24 is mounted to the engine holder 22, and the outboard motor 21 is attached to a transom of a hull H by means of the clamp bracket 24. A periphery of the engine 23 is covered by an engine cover 25.

Further, it is to be noted that the terms "right", "left", "upper", "lower" and the like are used herein with reference to the illustration of figures or in a state of the outboard motor mounted to the hull, for example.

The engine 23 mounted to the outboard motor 21 is, for example, a water-cooled type four-stroke-cycle in-line four-cylinder engine and is constituted by assembling engine constructing parts and members such as a cylinder head 26, a cylinder block 27, a crankcase 28 and like. Such engine is mounted on the engine holder 22.

A cylinder block 27 is arranged in a rear side, left side as viewed, of a crankcase 28 arranged in the forefront portion of the engine 23 (a right side in FIG. 2). Further, the cylinder head 26 is arranged in a rear side of the cylinder block 27. In this case, a rear portion of the cylinder head 26 is covered by a head cover 29. Further, a crank shaft 30 is substantially vertically arranged in a mating (bonding) portion between the crankcase 28 and the cylinder block 27 as shown in FIG. 1.

A shaft housing 31 is located in a lower portion of the engine 23, and an upper end portion of a drive shaft 32 is attached to a lower end portion of the crank shaft 30, for example, through a spline fitting. Further, the drive shaft 32 extends downward within the shaft housing 31 so as to drive a propeller 36 through a bevel gear 34 and a propeller shaft 35 disposed in a gear case 33 provided at a lower portion of the shaft housing 31.

Figure 3:
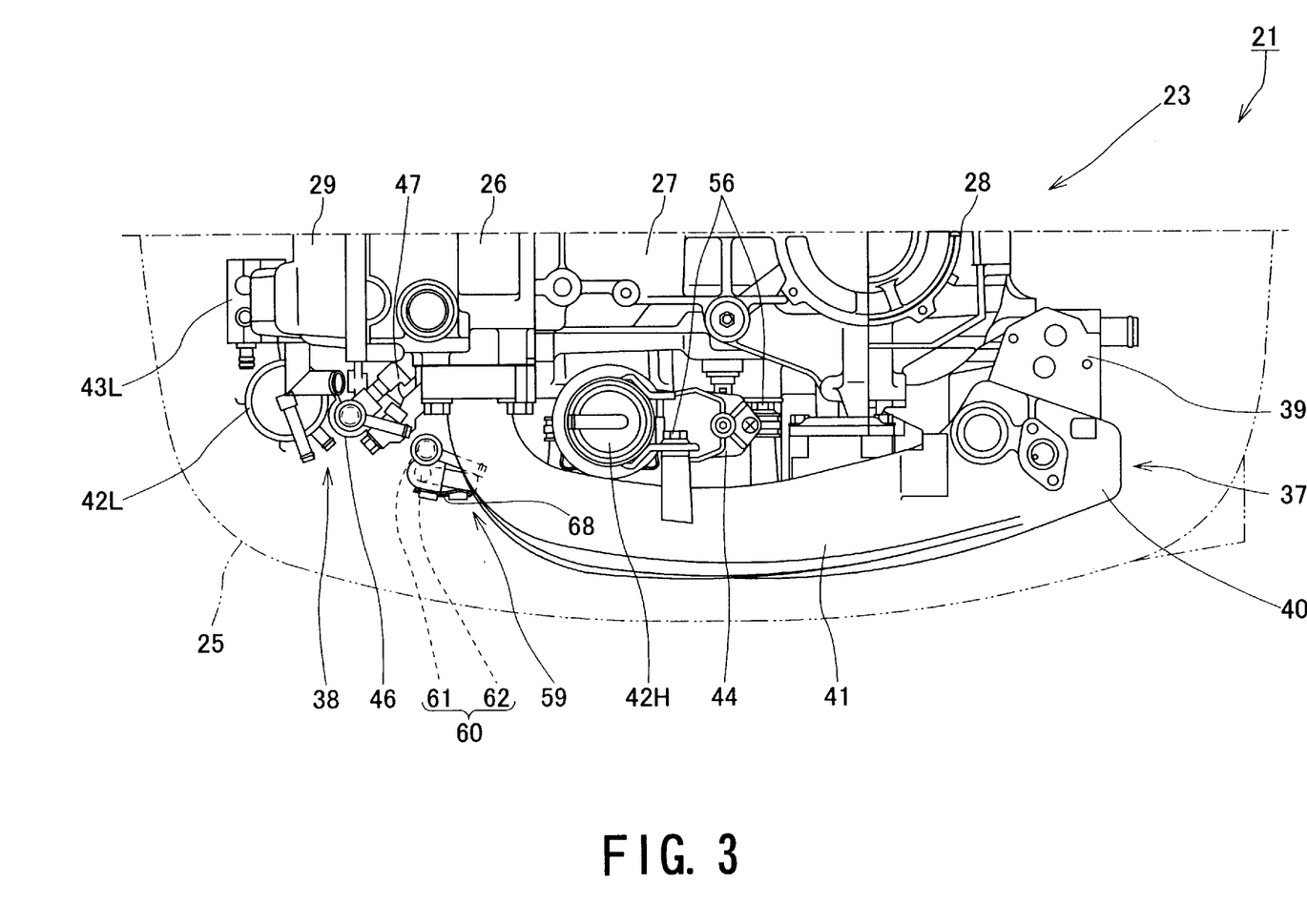
FIG. 3 is a top elevational view showing a first example of a right half of the engine.

As shown in FIGS. 2 and 3, an electrical equipment, not shown, a suction device 37, a fuel supply device 38 and like are arranged at a periphery of the engine 23. The suction device 37 is mainly constituted by a throttle body 39, a surge tank 40 and a suction manifold 41 extending from the surge tank 40 to each of cylinders. This suction device is arranged in one side of the engine 23, a right side thereof in the present embodiment in a collected manner. The suction manifolds 41 are arranged on a side surface of the cylinder block 27 in a vertical direction so as to communicate a suction port in each of the cylinders formed in the cylinder head 26 with an inner portion of the surge tank 40. In this case, the electrical equipment is arranged on an opposite side of the suction device 37, a left side of the engine 23 in the present embodiment in a collected manner.

The fuel supply device 38 has fuel system parts such as a filter, a pump and so on and is particularly constituted by low pressure and high pressure fuel filters 42L and 42H, low pressure and high pressure fuel pumps 43L and 43H, a vapor separator 44, a pressure regulator 45, a delivery pipe 46, a fuel injector 47 and so on. These respective parts are connected by means of low pressure and high pressure fuel hoses 48L and 48H so as to constitute a fuel system.

Figure 4:
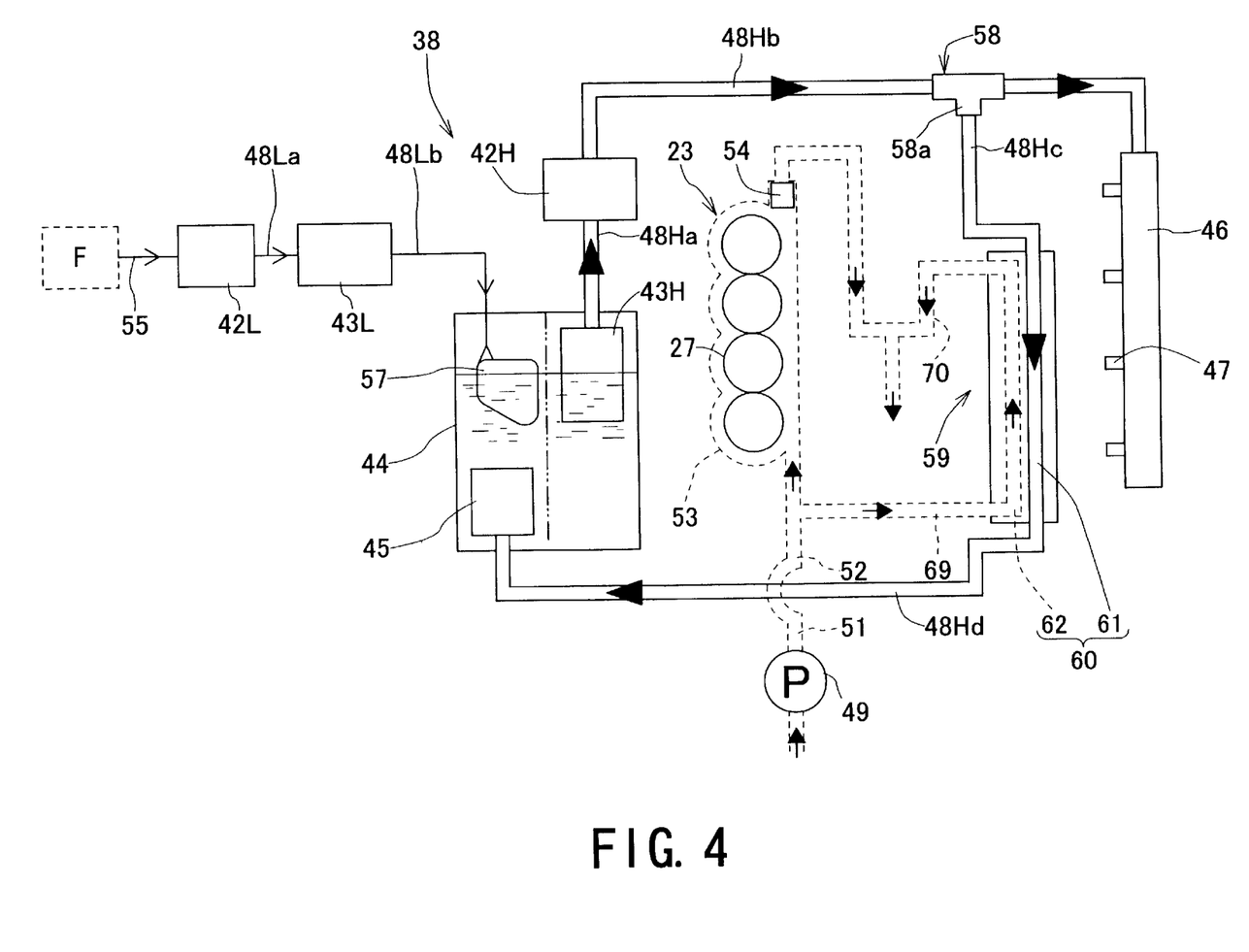
FIG. 4 is a block diagram showing an arrangement of a first example of a cooling system and a fuel system of the outboard motor.

Further, the engine 23 of the outboard motor 21 is a water-cooled type, and FIG. 4 is a block diagram showing the first example of the cooling system and the fuel system mentioned above. As shown in FIG. 4, the cooling water is taken from an intake port 50 (refer to FIG. 1) provided in the gear case 33, for example, by the operation of a water pump 49 driven by the drive shaft 32 and is introduced to a cooling water passage 52 disposed in the engine holder 22 through a water feeding pipe 51.

A portion of the cooling water is branched into two flows on an upstream side of the engine 23 before reaching the engine 23, one flow being introduced to the engine 23 and the other flow being introduced to the fuel system. The cooling water introduced to the engine 23 is then, for example, introduced to a water jacket 53 formed in the cylinder block 27 so as to cool the engine 23, and thereafter, is discharged. In this case, a thermostat 54 for preventing the engine 23 from being excessively cooled is provided at an outlet portion of the water jacket 53. The outboard motor 21 shown in the present embodiment is provided with a fuel tank F in a hull side, and as shown in FIG. 4, a fuel supply hose 55 extending from the fuel tank is connected to the low pressure fuel filter 42L.

A low pressure (mechanical) fuel pump 43L driven by a cam shaft, not shown, constituting a valve moving mechanism of the engine 23 is arranged to the head cover 29, and the low pressure fuel pump 43L and the low pressure fuel filter 42L are connected through a low pressure fuel hose 48La.

A space is formed between a left side surface of the cylinder block 27 and the suction manifold 41, and a vapor separator 44 is arranged in this space. Further, the vapor separator 44 is fixed, for example, to an inner side of the suction manifold 41 by means of bolts 56 or the like. The vapor separator 44 has a structure capable of separating a gasoline vapor contained in a liquid fuel, for example, in a gasoline to introduce only the vapor to the suction device 37 for the purpose of re-burning, and the fuel is introduced from the low pressure fuel pump 43L through the low pressure fuel hose 48Lb.

The high pressure fuel pump 43H is installed in the vapor separator 44, so that the fuel, from which the vapor is separated, is fed, to the high pressure fuel filter 42H through the high pressure fuel hose 48Ha under a predetermined pressure. The high pressure fuel pressure fed to the high pressure fuel filter 42H is fed to the delivery pipe 46 integrally mounted to the suction manifold 41 through the high pressure fuel hose 48Hb. Further, the fuel injector 47 is mounted to the delivery pipe 46 at each of the cylinders, and the fuel injector 47 injects the high pressure fuel in the suction port.

An inner portion of the vapor separator 44 is sectioned in a width direction thereof, and a float 57 for adjusting a fuel flow amount into the vapor separator 44 is arranged in a low pressure fuel inlet side fuel reservoir. On the other hand, the high pressure fuel pump 43H is dipped in a high pressure fuel outlet side fuel reservoir. Further, a pressure regulator 45 also acting an inlet means of the high pressure fuel and reducing a pressure of the high pressure return fuel is arranged to the lower portion of the low pressure fuel inlet side fuel reservoir.

As shown in FIGS. 2 and 4, a branch pipe 58 is provided on the way of the high pressure fuel hose 48Hb extending from the high pressure fuel filter 42H to the delivery pipe 46. A high pressure return fuel hose 48Hc extending to the vapor separator 44 is connected to a branch portion 58a of the branch pipe 58 and is connected to the pressure regulator 45 in the vapor separator 44. Further, a fuel cooler 60 of a fuel cooling apparatus 59 is provided on the way of the high pressure return fuel hose 48Hc extending from the branch pipe 58 to the vapor separator 44.

Figure 5:
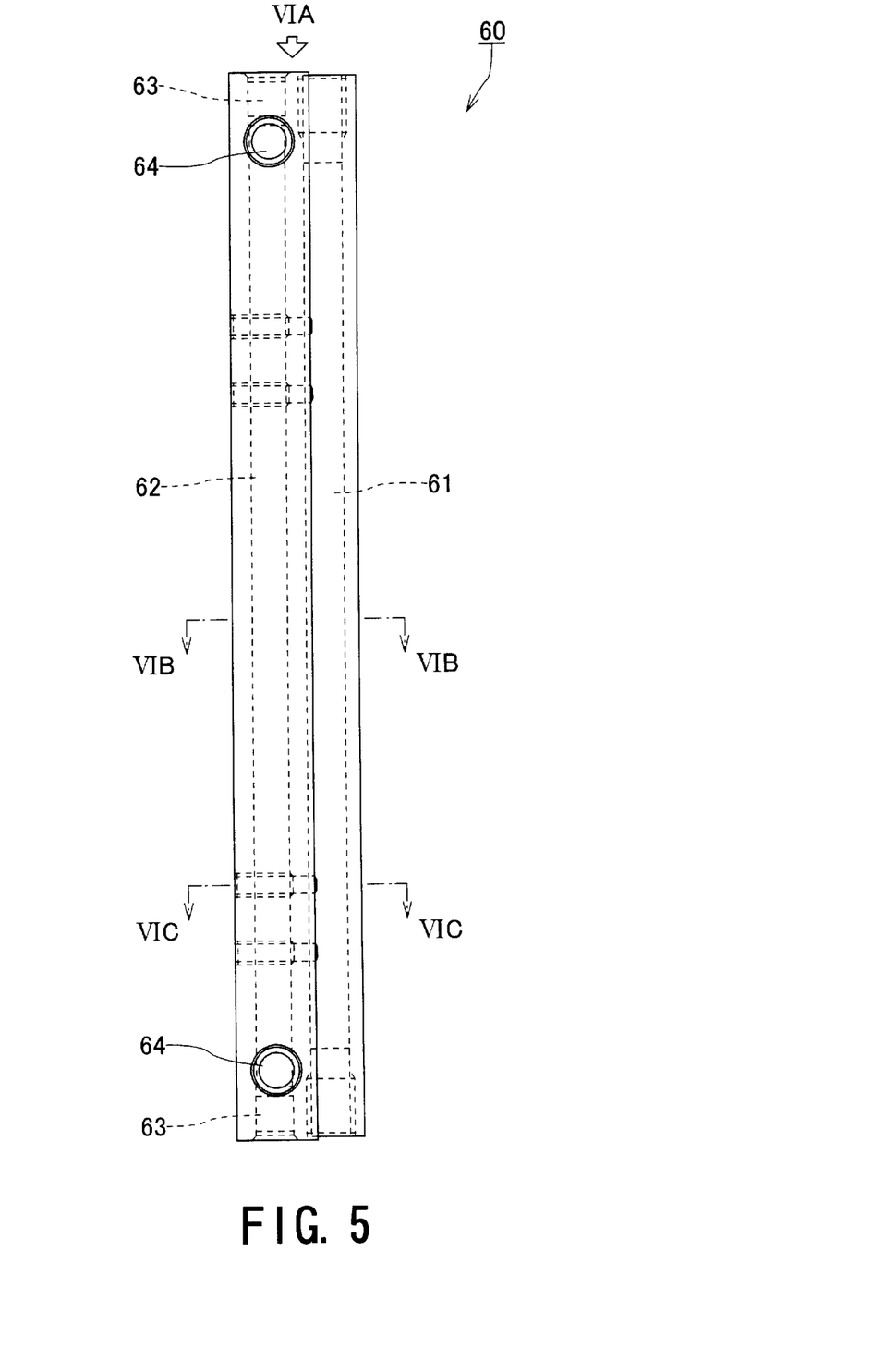
FIG. 5 is an elevational view of a fuel cooler shown in FIG. 4.
Figure 6A:
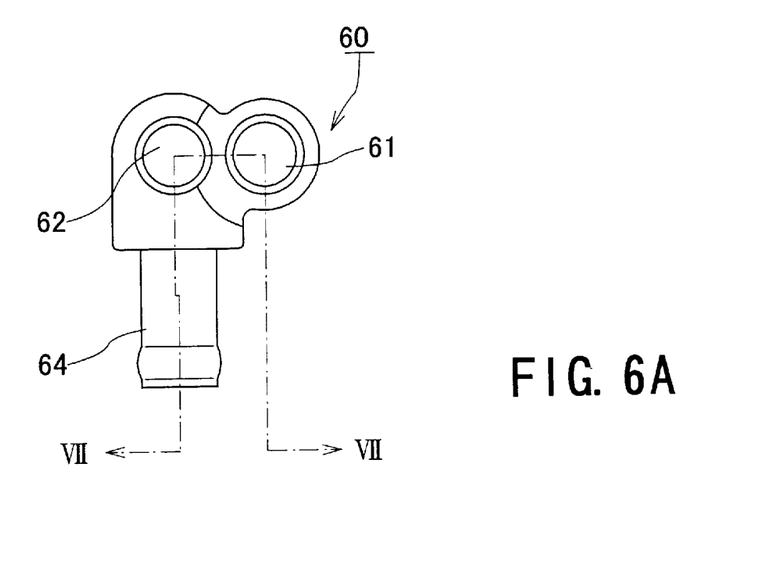
FIGS. 6A, 6B and 6C are cross sectional views along lines VIA—VIA, VIB—VIB and VIC—VIC in FIG. 5, respectively.
Figure 6B:
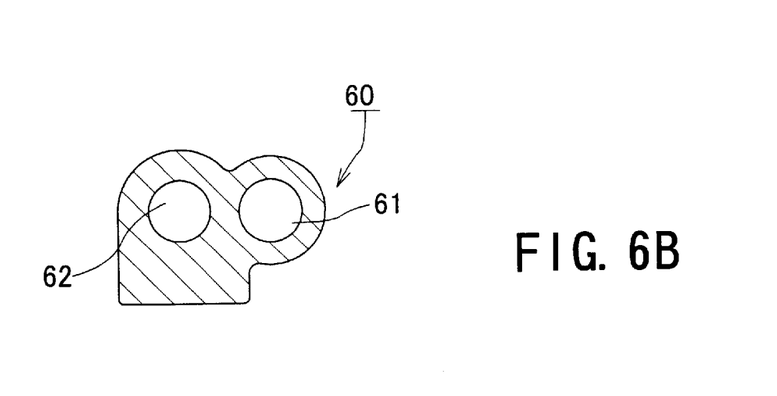
Figure 6C:
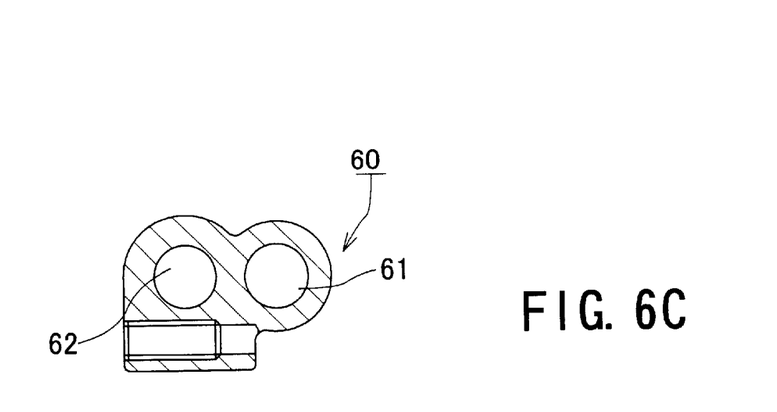
Figure 7:
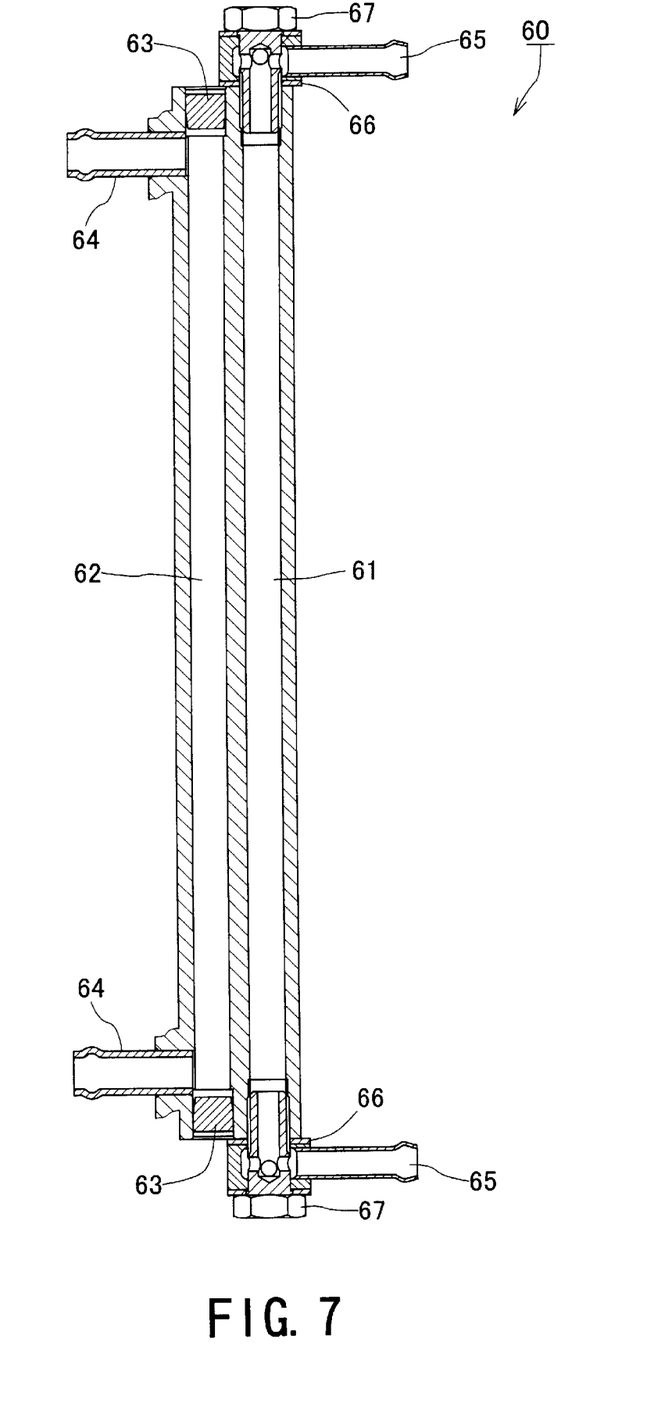
FIG. 7 is a cross sectional view along a line VII—VII in FIG. 6A.

As shown in FIGS. 5 to 7, in the fuel cooler 60, a pipe-shaped fuel passage 61 and a cooling water passage 62 are arranged side by side in parallel to each other, and both passages 61 and 62 may integrally formed with each other. Further, the fuel cooler 60 is produced by an extrusion (or draw) molding of an aluminum material. Both the passages 61 and 62 are formed so as to extend in a vertical direction.

Upper and lower ends of the cooling water passage 62 are respectively closed by plugs 63 and cooling water unions 64 are pressure inserted near the upper and lower ends so as to be vertical to the cooling water passage 62, the cooling water unions 64 forming outlet and inlet ports for the cooling water. On the other hand, fuel unions 65 are respectively secured to upper and lower end surfaces of the fuel passage 61 through gaskets 66 by means union bolts 67, the fuel unions 65 forming outlet and inlet ports for the fuel.

Further, as shown in FIGS. 2 and 3, the fuel cooler 60 is arranged in a space formed in the vertical direction between a mounting portion of the suction manifold 41 to the cylinder block 27 and the delivery pipe 46 and is fixed to the suction manifold 41 through at least one bracket 68, for example, at two upper and lower portions in the illustrated embodiment.

As shown in FIGS. 2 and 4, a high pressure return fuel hose 48Hc extending from the branch portion 58a of the branch pipe 58 is connected to the upper fuel union 65, and a high pressure return fuel hose 48Hd extends from the lower fuel union 65 towards the pressure regulator 45 in the vapor separator 44. A cooling water hose 69, branched from the cooling water passage 52 in the engine holder 22, extends therefrom and is connected to the lower cooling water union 64. A water discharge hose 70 is connected to the upper cooling water union 64. Thus, the fuel cooling apparatus 59 is constituted by the fuel cooler 60, the fuel unions 65, the cooling water unions 64 and so on.

The fuel cooling apparatus of the structure mentioned above will operate as follows.

The fuel in the fuel tank F is temporarily fed to the vapor separator 44 through the operation of the low pressure fuel pump 43L, the vapor is separated in the vapor separator 44 and only the vapor is released to the open air. Thereafter, the vapor is fed under pressure to the delivery pipe 46 by the high pressure fuel pump 43H in the vapor separator 44, and the high pressure fuel is injected in the suction port by the fuel injector 47.

The branch pipe 58 is incorporated on the way of the high pressure fuel hose 48Hb in front of the delivery pipe 46, a portion of the fuel fed by the operation of the high pressure fuel pump 43H is introduced to the fuel passage 61 of the fuel cooler 60, which constitutes the fuel cooling apparatus 59, from the branch portion 58a of the branch pipe 58.

On the other hand, the cooling water taken by the water pump 49 is branched into two flows on the upstream side of the engine 23, one of the branched cooling water portions being introduced to the cooling water passage 62 of the fuel cooler 60. The cooling water passage 62 is arranged side by side in parallel to the fuel passage 61 as mentioned above, and the cooling water in the cooling water passage 62 is discharged after cooling the fuel in the fuel passage 61.

Further, the thus cooled fuel in the fuel passage 61 is reduced in pressure in the pressure regulator 45 and is returned to the vapor separator 44, thereby preventing the temperature of the fuel within the vapor separator 44 from being increased so as to restrict a generation of the fuel vapor to a low level.

Since the fuel cooling apparatus 59 is provided independently from the vapor separator 44, the structure of the vapor separator 44 is made simple and it is possible to make simple and small the outer shape thereof, providing the outboard motor 21 having a compact size.

Further, since the fuel passage 61 and the cooling water passage 62 of the fuel cooler 60 are arranged side by side in parallel to each other and both the passages 61 and 62 are integrally formed, it is possible to make the structure simple and reduce the number of the parts, whereby a production cost can be reduced and an operational reliability can be improved.

The fuel cooler 60 is extrusion (or draw) molded from an aluminum material, the structure and the shape thereof can be made simple, and the manufacturing cost can be reduced.

Furthermore, since the fuel cooler 60 is mounted to the suction manifold 41 through the bracket 68, it is possible to reduce the number of assembling steps due to the modulation, reduce a weight and make the outer shape of the cooling apparatus simple.

Still furthermore, since the fuel cooler 60 is arranged in the space formed in the vertical direction between the mounting portion of the suction manifold 41 to the cylinder block 27 and the delivery pipe 46, it is possible to effectively utilize a dead space, and since the fuel cooler does not interfere with the shape of the engine cover 25, it is possible to prevent the outboard motor 21 from being made large.

Still furthermore, since the cooling water for cooling the engine is branched into two flows at the upstream side of the engine 23, one of them being introduced to the fuel cooler 60. The temperature of the cooling water becomes sufficiently low and the fuel cooler 60 has a great cooling effect for the fuel.

Still furthermore, a cost involved for the corrosion-proof structure of both the pump 43H and regulator 45 can be reduced and the number of assembling steps due to the modulation can be also reduced according to the arrangement thereof mentioned above. However, these members 43H and 45 may be arranged out of the vapor separator 44.

Figure 8:
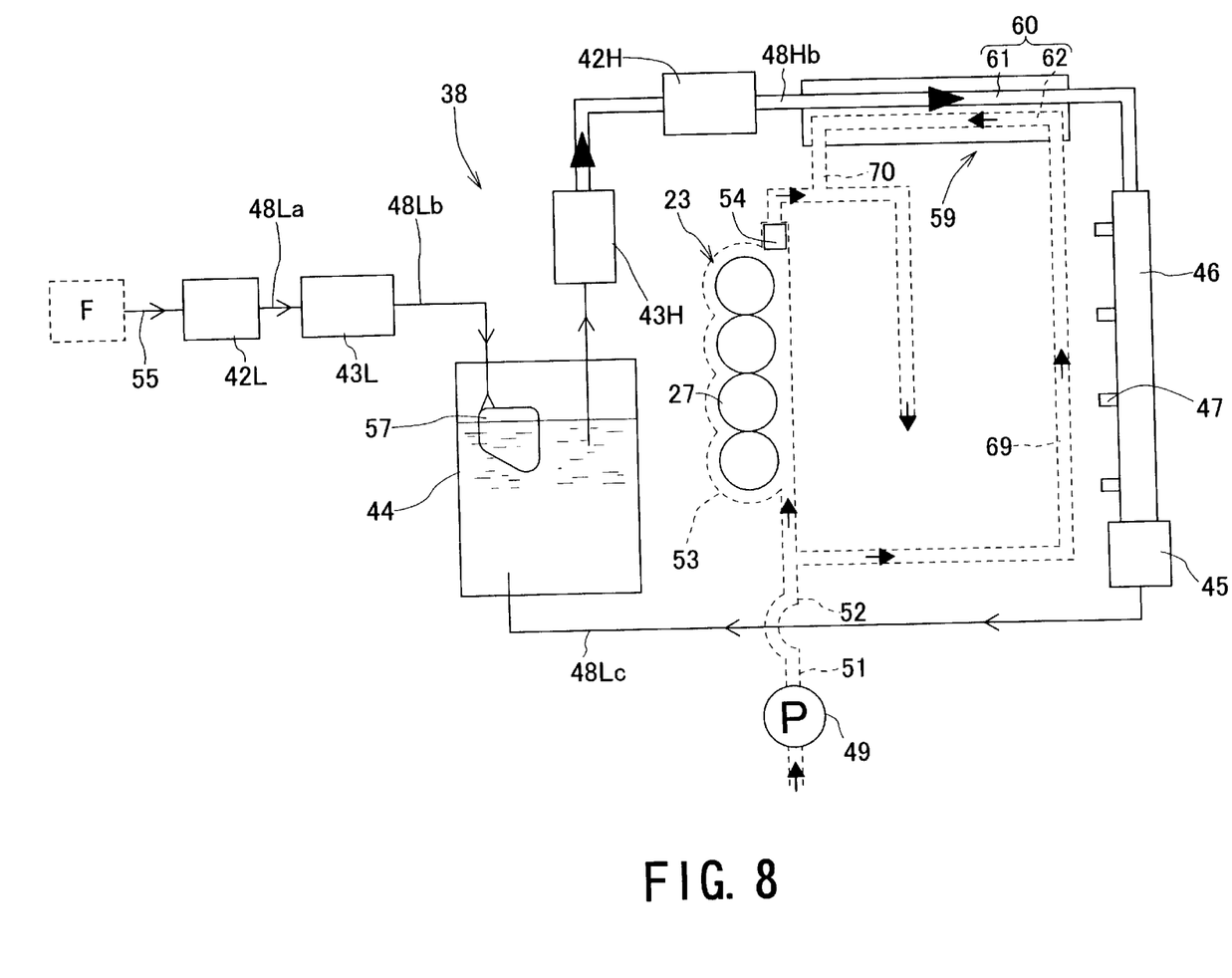
FIG. 8 is a block diagram showing a second example of a cooling system and a fuel system.
Figure 9:
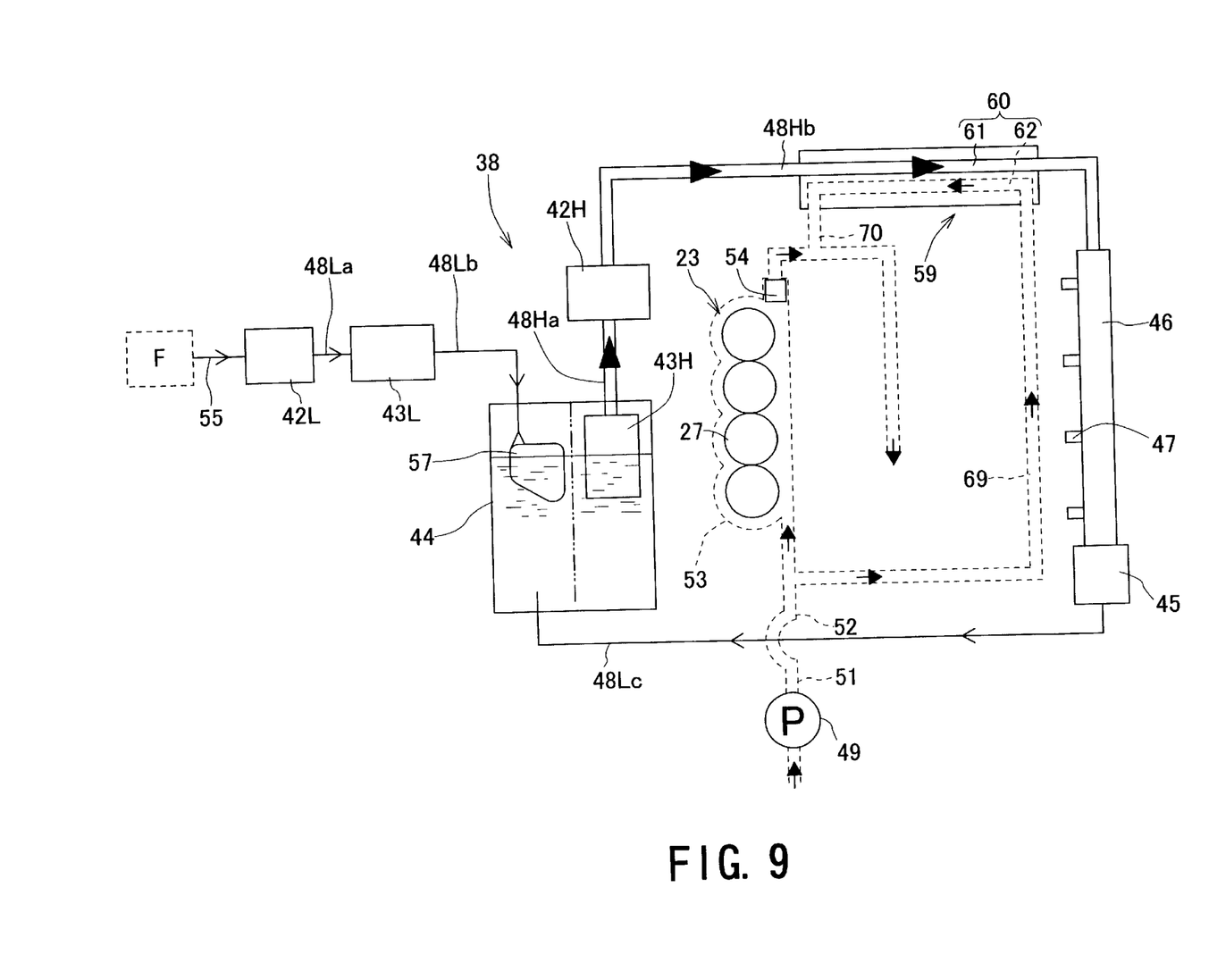
FIG. 9 is a block diagram showing a third example of a cooling system and a fuel system.

FIGS. 8 and 9 are block diagrams showing a second example of a cooling system and a fuel system and a third example thereof, in which the same reference numerals are added to the elements and members corresponding to those of the first example of the cooling system and the fuel system shown in FIG. 4.

As shown in FIGS. 8 and 9, in both examples, the fuel discharged by the high pressure fuel pump 43H is not branched on the way thereof and fed to the delivery pipe 46 after being cooled by the fuel cooler 60 to be injected from the fuel injector 47. The surplus fuel is then returned to the vapor separator 44 through the low pressure return fuel hose 48Lc after the pressure has been reduced by the pressure regulator 45 arranged at the downstream end of the delivery pipe 46, i.e. out of the vapor separator 44. In this case, in the second example, the high pressure fuel pump 43H is also arranged out of the vapor separator 44.

It is to be noted that the present invention is not limited to the described embodiment and many other changes and modifications may be made without departing from the scopes of the appended claims.

What is claimed is:

1. A fuel cooling apparatus for an outboard motor, the outboard motor being provided with a water-cooled engine having a crank shaft arranged substantially in a vertical direction, a vapor separator, a fuel injector positioned to supply a fuel from the vapor separator into the engine, a high pressure fuel pump positioned in the vapor separator so as to feed the fuel under pressure to the fuel injector, and a pressure regulator positioned in the vapor separator so as to reduce a pressure of a return fuel, the fuel cooling apparatus comprising a fuel cooler having a fuel passage and a cooling water passage arranged side by side in parallel to each other, the fuel passage interposed in a high pressure return fuel hose branched off from a high pressure fuel hose connecting the high pressure fuel pump and the fuel injector and connected to an upstream side of the pressure regulator, the cooling water passage being positioned to circulate cooling water for cooling the engine so as to cool the fuel in the fuel passage.

2. A fuel cooling apparatus of an outboard motor according to claim 1, wherein the engine is provided, on a side surface thereof, with a suction manifold constituting a suction device and the fuel cooler is mounted to the suction manifold through at least one bracket.

3. A fuel cooling apparatus in an outboard motor according to claim 2, wherein the fuel cooler is arranged in a space between a mounting portion of the suction manifold and a delivery pipe to which the fuel injector is mounted.

4. A fuel cooling apparatus of an outboard motor according to claim 1, wherein the cooling water for cooling the engine is branched to an upstream of the engine and one of the branched cooling water portions is introduced to the fuel cooler.

5. An outboard motor, comprising:

a water-cooled engine;

a vapor separator configured to separate vapor in a fuel for the water-cooled engine;

a fuel injector positioned to inject the fuel from the vapor separator into the water-cooled engine;

a high pressure fuel pump disposed in the vapor separator for feeding the fuel under pressure to the fuel injector; and a fuel cooler including a fuel passage and a cooling water passage provided side by side therein, the fuel passage being interposed in a high pressure return fuel hose branched off from a high pressure fuel hose connecting the high pressure fuel pump and the fuel injector and connected to the vapor separator, the cooling water passage being positioned to circulate cooling water for cooling the water-cooled engine.

6. An outboard motor according to claim 5, further comprising a pressure regulator disposed in the vapor separator and positioned to reduce a pressure of the fuel returned from the high pressure return fuel hose.

7. An outboard motor according to claim 5, wherein:

the water-cooled engine has a suction device having a suction manifold on a side surface of the water-cooled engine; and the fuel cooler is mounted to the suction manifold through at least one bracket.

8. An outboard motor according to claim 7, wherein the fuel cooler is positioned between a mounting portion of the suction manifold and a delivery pipe to which the fuel injector is mounted.

9. An outboard motor according to claim 5, wherein the fuel cooler receives a portion of the cooling water for cooling the water-cooled engine before the cooling water reaches the water-cooled engine.

10. An outboard motor according to claim 5, wherein the fuel cooler comprises an aluminum material which is extrusion molded to have the fuel passage and the cooling water passage integrally therein.

11. An outboard motor, comprising:

a water-cooled engine;

a vapor separator configured to separate vapor in a fuel for the water-cooled engine;

fuel injecting means for injecting the fuel from the vapor separator into the water-cooled engine;

pumping means for pumping the fuel in the vapor separator to the fuel injector; and fuel cooling means for cooling a surplus fuel from the fuel pumped by the pumping means by using a cooling water for cooling the water-cooled engine.

* * * * *